UNITED STATES PATENT OFFICE.

EMIL COLLETT, OF CHRISTIANIA, NORWAY, ASSIGNOR TO NORSK HYDRO-ELEKTRISK KVAELSTOFAKTIESELSKAB, OF CHRISTIANIA, NORWAY.

PROCESS OF SIMULTANEOUSLY PRODUCING PHOSPHATE AND NITRATE OF AMMONIA.

1,058,037.  Specification of Letters Patent.  Patented Apr. 8, 1913.

No Drawing.  Application filed November 11, 1912. Serial No. 730,821.

*To all whom it may concern:*

Be it known that I, EMIL COLLETT, a subject of the King of Norway, residing at Christiania, Norway, have invented certain new and useful Improvements in Processes of Simultaneously Producing Phosphate and Nitrate of Ammonia; and I do hereby declare the following to be a full, clear, and exact description of the invention, such as will enable others skilled in the art to which it appertains to make and use the same.

This invention has for its object a process of simultaneously producing phosphate and nitrate of ammonia.

In the manufacture of phosphate of ammonia according to the methods at present employed various drawbacks prevail. Thus if for instance mono-calcium phosphate is reacted upon with sulfate of ammonia great amounts of sulfate of calcium are obtained in the resulting acid solution and this sulfate of lime renders it difficult to obtain a pure product and causes also the formation of scale in the evaporators.

The applicant has now found that if the production of phosphate of ammonia is combined with the production of nitrate of ammonia as below described important advantages are obtained over the methods already known. Among other advantages attained is that the solubility of the sulfate of lime is very considerably reduced and in consequence thereof that a purer product is obtained.

The process may for instance be carried out in the following manner: A phosphate of lime, insoluble in water is dissolved in dilute nitric acid and to the acid solution thus produced sulfate of ammonia is added in such quantity, that the lime is precipitated as sulfate.

When tri-calcium-phosphate is employed the reactions will take place according to the following equations 1. $Ca_3(PO_4)_2 + 4HNO_3 = CaH_4(PO_4)_2 + 2Ca(NO_3)_2$ 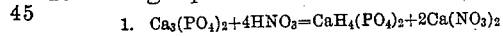
2. $CaH_4(PO_4)_2 + 2Ca(NO_3)_2 + 3(NH_4)_2SO_4 =$ 
   $3CaSO_4 + 4NH_4NO_3 + 2NH_4H_2(PO_4)$ The solution which chiefly contains phosphate and nitrate of ammonia is separated from the precipitate and neutralized with ammonia or carbonate of ammonia, whereupon it is evaporated until crystallization. By means of fractional crystallization the salts may be separated from one another.

The great economical and practical advantages obtained by combining the said methods as above specified are obvious, an amount of phosphoric acid equivalent to the amount of nitric acid employed being hereby transformed into soluble form practically without loss.

Claims.—

1. Process of simultaneously producing phosphate of ammonia and nitrate of ammonia from dilute nitric acid and phosphates of lime that are insoluble in water, which comprises dissolving said phosphates in dilute nitric acid and reacting thereon with sulfate of ammonia and separating the resulting solution containing phosphate and nitrate of ammonia from the precipitate.

2. Process of simultaneously producing phosphate of ammonia and nitrate of ammonia from dilute nitric acid and phosphates of lime that are insoluble in water, which comprises dissolving said phosphates in dilute nitric acid and reacting thereon with sulfate of ammonia, separating the resulting solution containing phosphate and nitrate of ammonia from the precipitate and separating the ammonium nitrate and ammonium phosphate by crystallization.

In testimony that I claim the foregoing as my invention, I have signed my name in presence of two subscribing witnesses.

EMIL COLLETT.

Witnesses:
M. E. GUTTORMSEN,
RUTH LINDSTROM.